(12) United States Patent
Osterländer et al.

(10) Patent No.: US 7,107,805 B2
(45) Date of Patent: Sep. 19, 2006

(54) METHOD FOR THE PRODUCTION OF A SPINDLE NUT OF A SPHERICAL THREAD DRIVE MECHANISM

(75) Inventors: Jürgen Osterländer, Emskirchen (DE); Manfred Kraus, Herzogenaurach (DE); Torsten Keller, Hessdorf (DE); Thomas Motz, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 23 days.

(21) Appl. No.: 11/053,578

(22) Filed: Feb. 8, 2005

(65) Prior Publication Data

US 2005/0204562 A1    Sep. 22, 2005

Related U.S. Application Data

(63) Continuation of application No. PCT/EP03/08338, filed on Jul. 29, 2003.

(30) Foreign Application Priority Data

Aug. 8, 2002   (DE) ................................ 102 36 281

(51) Int. Cl.
 *B21J 7/16*     (2006.01)
 *B21C 25/02*    (2006.01)
 *F16H 1/24*     (2006.01)

(52) U.S. Cl. .................... 72/76; 72/117; 72/370.04; 72/370.21; 470/25

(58) Field of Classification Search ................ 72/76, 72/112, 113, 115, 117, 370.04, 370.06, 370.08, 72/370.21, 393, 402; 470/18, 25; 474/424.82, 474/424.84, 424.85

See application file for complete search history.

(56) References Cited

U.S. PATENT DOCUMENTS

| | | | | |
|---|---|---|---|---|
| 3,349,600 A | * | 10/1967 | Bijvoet ......................... | 72/393 |
| 3,667,311 A | | 6/1972 | Wysong | |
| 4,612,817 A | * | 9/1986 | Neff ......................... | 74/424.75 |
| 5,040,294 A | * | 8/1991 | Harle ......................... | 29/888.1 |
| 5,056,211 A | * | 10/1991 | Hauser ......................... | 29/527.2 |
| 5,492,030 A | * | 2/1996 | Benton et al. ................. | 74/441 |
| 6,334,370 B1 | * | 1/2002 | Sonoda et al. ........... | 74/424.81 |
| 6,446,520 B1 | * | 9/2002 | Nagai et al. ............... | 74/89.33 |
| 6,851,330 B1 | * | 2/2005 | Buchanan et al. ........ | 74/424.78 |

FOREIGN PATENT DOCUMENTS

DE             32 03 233             9/1962

(Continued)

Primary Examiner—Ed Tolan
(74) Attorney, Agent, or Firm—Volpe and Koenig, P.C.

(57) ABSTRACT

Method for the production of a spindle nut (3) of a spherical thread drive mechanism, whereby the spindle nut (3) has at least one screw-shaped track (4) formed as a single piece on its inner circumference, whose threads (38) are limited by shoulders (6). The shoulder (6) is interrupted by a deflecting recess (23) at at least one deflecting position, in order to deflect balls (13) out of one thread into an adjacent thread (38). The method includes locating a tool arbor (56) in a hollow blank (57), whereby the tool arbor (56) has on its outer circumference a counter profile of the screw-shaped track (4) and a projecting part (59) for each deflecting recess. A tool operates on and reshapes the blank (57) from the exterior by exercising radial forces (F), whereby during the reshaping process the inner circumferential surface of the blank (57) is shaped according to the counter profile and to the projecting part (59) of the tool arbor (56) such that the screw-shaped track (4) and the deflecting recess (23) are formed.

6 Claims, 3 Drawing Sheets

FOREIGN PATENT DOCUMENTS

| | | |
|---|---|---|
| DE | 31 00 349 A1 | 8/1982 |
| DE | 31 00 349 C2 | 3/1989 |
| DE | 41 31 486 | 3/1993 |
| DE | 199 11 432 | 9/2000 |
| DE | 199 44 875 | 3/2001 |
| DE | 199 36 837 | 11/2001 |
| GB | 897008 | 5/1962 |
| WO | WO 01/11264 | 2/2001 |

* cited by examiner

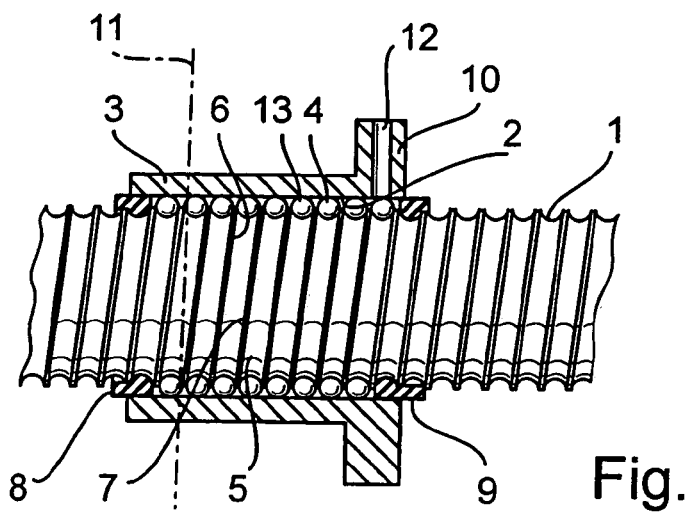
Fig. 1
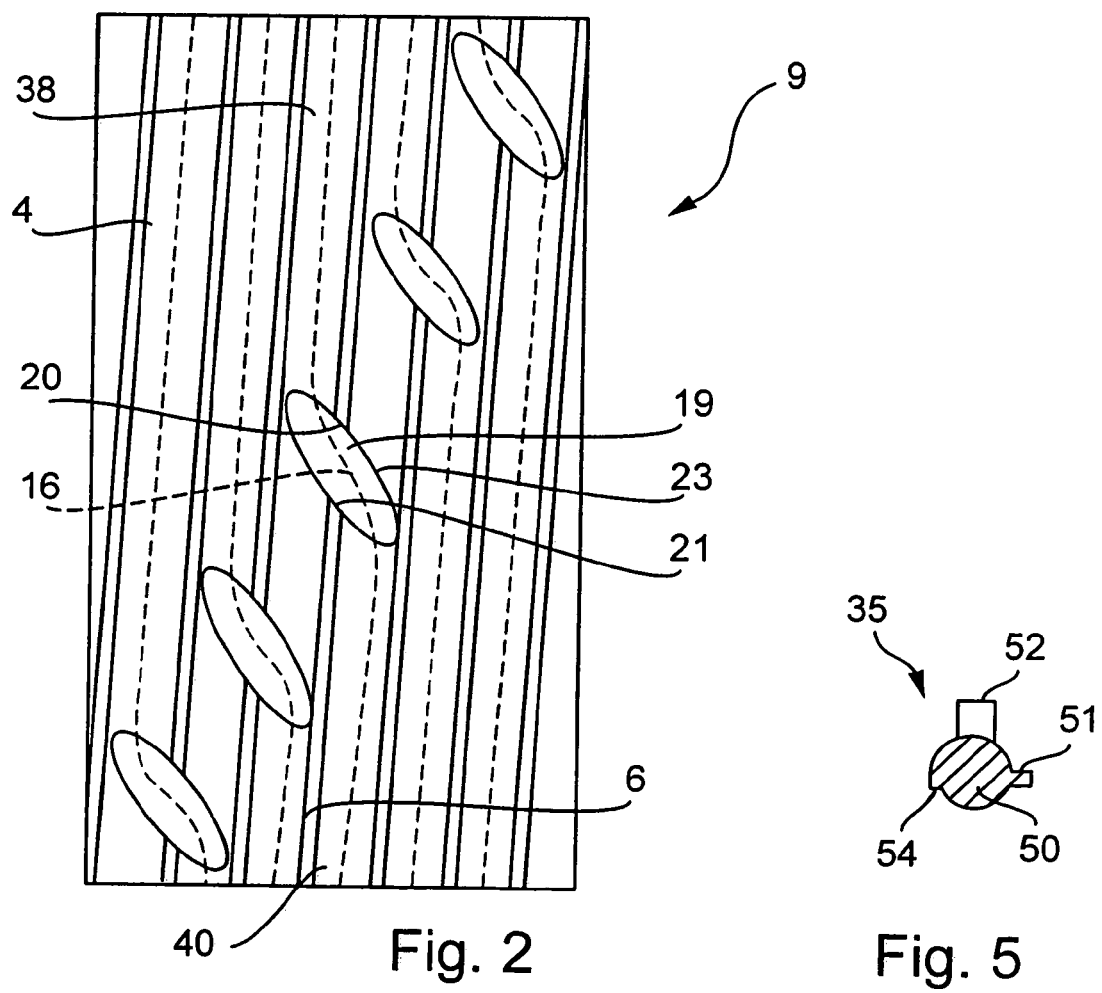
Fig. 2
Fig. 5

METHOD FOR THE PRODUCTION OF A SPINDLE NUT OF A SPHERICAL THREAD DRIVE MECHANISM

This is application is a continuation of PCT/EP03/08338 filed Jul. 29, 2003.

BACKGROUND

The present invention relates to a method for the production of a spindle nut of a spherical thread drive mechanism.

From DE 31 00 349 C2, for example, a spherical thread drive mechanism of a spherical roll spindle and one of these encompassing bearing nuts under formation of an annular gap have been known, which have screw-shaped circular recessed tracks of the same slope facing one another. The threads of the tracks are separated from one another by means of corresponding screw-shaped circular raised shoulders. The tracks form spherical tracks that extend over an angle of circumference of approximately 360°, whereby bearing balls run in these spherical tracks. Each spherical track has an approximately S-shaped deflecting position, at which the balls are deflected out of one thread of the track into the adjacent thread. The spindle nut has an interruption in the shoulder at the deflecting position and a deflecting recess. The deflecting recess is necessary so that the balls can be raised over the corresponding shoulder of the spindle. The deflecting recesses are directly formed in the nut in an advantageous manner, such that these can be formed completely closed all around. The incorporation of the deflecting recesses can take place after the hardening of the spindle nut, for example, electrolytically or by means of electrical discharge machining.

This production of the deflecting recesses is very expensive for large runs of a series.

SUMMARY

The object of the present invention is to provide a method for the production of a spindle nut according to the invention, with which large lots can be produced in a cost-effective manner.

The method according to the invention provides for the following steps: arrangement of a tool arbor in a hollow blank, whereby the tool arbor has on its outer circumference a counter profile of the screw-shaped spherical track and a projecting part for each deflecting recess; providing a tool that operates on and reshapes the blank from the exterior by exercising radial forces, whereby during this reshaping process the inner circumferential surface of the blank is shaped according to the counter profile and to the projecting part of the tool arbor such that the screw-shaped spherical track and the deflecting recess are formed. During this process, material of the blank is displaced in order to produce the tracks and the deflecting recesses on the inner circumferential surface.

The method according to the invention can be carried out in a cost-effective manner. Well known reshaping methods suitable for the invention are, for example, kneading, cold forming by spinning, as well as fluid forming. The material of the blank is forced inwardly during this reshaping process and shaped to the contour of the tool arbor with the projecting parts. The well known kneading is suitable in a particular manner for the production of a spindle nut according to the invention, because rotationally unsymmetrical contours are easily produced by means of this method, whereby kneading jaws under radial impact action operate on the blank that is rotating relative to the kneading jaws and reshape them.

After the reshaping process, the tool arbor together with the projecting part is removed, after which the spindle nut can undergo a heat treatment. The spindle nut hardened in such a manner can be completed with additional component parts for the spherical thread drive mechanism. The method for the production of the spindle nut can take place with the subsequent heat treatment in production steps that follow one another, such that the spindle nuts according to the invention can be produced in a commercially efficient manner.

A device according to the invention for the implementation of the described method provides that the tool arbor has a recess in which the projecting part is formed as a stamp, which can be affixed in its extended position radially transverse outwards and inwards in comparison with the tool arbor, whereby the stamp is arranged in its extended position within the counter profile of the tool arbor. A problem-free removal is ensured with this device according to the invention. If the tool arbor is to be rotated forth out of the spindle nut in a screwing motion, the stamp is moved inward radially beforehand, such that a screwing motion is as problem-free as possible.

The tool arbor can be formed in a hollow manner for the operation of the stamp, whereby a connecting rod arranged in the hollow tool arbor works with the stamp, such connecting rod being held in its extended position in a primary connecting position of the connecting rod of the stamp. The connecting rod is then brought into a second connecting position for removal from the mold, which makes an inward shift of the stamp possible. However, the tool arbor can also be filled with hydraulic fluid in place of a connecting rod, which can be pressurized, whereby this hydraulic fluid works together with the stamp of this type, which is held in its extended position by means of the adjacent pressure. After taking away the pressure, the stamp can be removed radially inward, in order to rotate the tool arbor out of the spindle nut using a screwing motion.

BRIEF DESCRIPTION OF THE DRAWINGS

An exemplary embodiment of the invention is described in connection with the drawings. In the drawings:

FIG. 1 is longitudinal section in schematic representation of a spherical thread drive mechanism;

FIG. 2 is a view of the processing of the nut of a spherical thread drive mechanism according to the invention with deflecting positions distributed over the circumference;

FIG. 5 is a cross section parallel to the corresponding view according to the lines V—V in FIG. 4 of one of the insertion bodies of the deflecting system according to FIGS. 3 and 4;

DETAILED DESCRIPTION OF THE PREFERRED EMBODIMENTS

Figure 3:
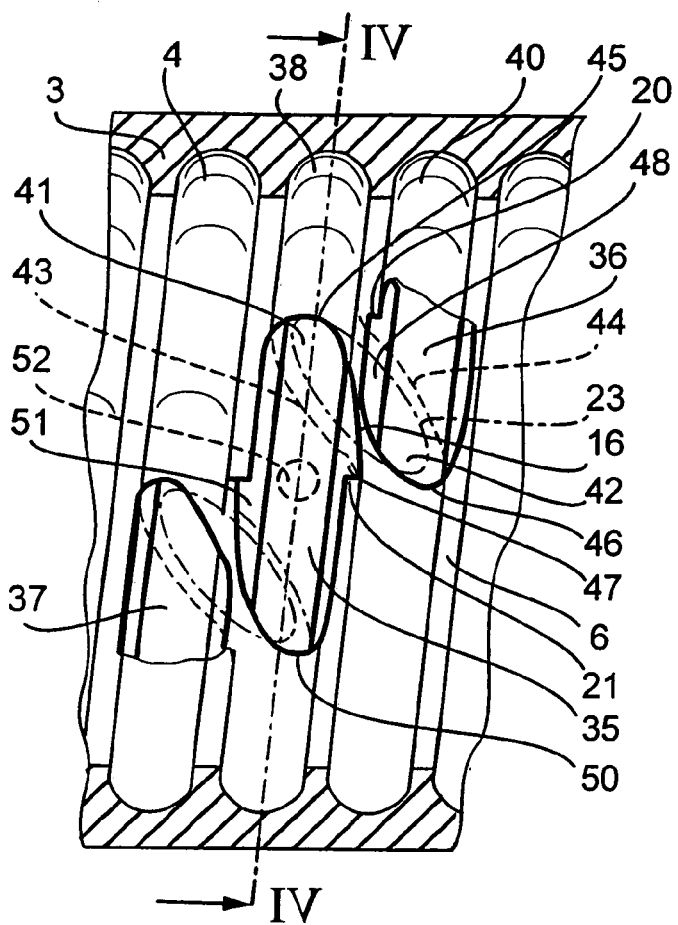
FIG. 3 is a longitudinal section view in partial representation of the nut of the thread drive mechanism according to the invention with inserted insertion bodies, but without the spindle.

FIG. 1 shows the schematic assembly of a spherical roll spindle. The spindle 1 is encompassed by a bearing nut 3 by using an annular gap 2. Depending on the type of a thread, a screw-shaped circular recessed track 4 is incorporated at the inner circumference of the nut 3, which likewise faces a screw-shaped recessed track 5 on the outer side of the spindle 1. Both of the tracks 4, 5 have the same slope and the individual threads of the track 4 of the nut 3 or the track 5 of the spindle 1 are separated from one another by means of a corresponding screw-shaped circular raised shoulder 6 or 7. The nut 3 can be sealed at the end sides against the spindle 1 with the help of strippers (wiper rings) 8, 9, and they can have a radially distant circumferential surface 10 at an end, with whose help the nut 3 can be fastened to an arbitrary component part 11. In addition, cylindrical embodiments without a flange or with various other outer forms are possible. The flange 10 has, for example, a lubrication connection 12 for pouring a lubricant into the annular gap 2.

The tracks 4, 5 of the nut and the spindle that are facing one another form spherical tracks or spherical runs, in which balls 13 revolve to bear the spindle 1, which is itself rotating. As a result of the annular gap 2, the spindle 1 does not lie adjacent to the nut 3, and it supports itself on it only by means of the balls 13.

In each case, the spherical tracks extend over an angle of circumference of 360°. In order to obtain spherical tracks enclosed in themselves (these are plotted with dotted lines in FIG. 2), each spherical track contains an approximately S-shaped deflecting position 16. At the same time, the deflecting positions 16 of the various spherical tracks are distributed equally over the circumference. A ball 13 entering from above in FIG. 3, from above the drawing plane (as is indicated with dotted lines in FIG. 4), for example in the thread of the track 4 of the nut 3 and in the facing thread 39 of the track 5 of the spindle 1, rolls along these threads 40 of the track 4 of the nut 3 and is led back into the thread of the track of the spindle 1 facing it. This track leads through to the lower end in FIG. 3 out of the drawing plane, and the ball rolls off above the drawing plane into the related thread areas of the nut 3 and the spindle 1 that are not visible, until it enters again above in the thread 38 of the nut and the thread 39 of the spindle. Viewed as a whole, in this manner one obtains a screw-shaped spherical track that runs over almost 360°, whereby the ends of the screw-shaped areas at the deflecting positions 16 are associated with one another. The course of spherical tracks of this type, in which the balls are led back internally, are well-known, such that nothing further about them should be suggested.

So that the balls 13 can be led back to the respective deflecting positions 16, the shoulder 6 of the nut 3 has an interruption 19 at the deflecting position 16. The dividing edges of these interruptions are designated with the reference numbers 20 and 21. In addition, a deflecting recess 23 crossing the interruption 19 at the deflecting position 16 is incorporated into the wall of the nut 3 by means of a method described further below. The deflecting recess 23 is so deep that a ball that dips into it no longer touches the shoulder 7 of the spindle 1. In this manner, the balls 13 can roll around in a radial direction outside the uninterrupted shoulder 7 of the spindle by means of the deflecting recess 23 and the interruption 19 of the shoulder 6 of the nut 3. As a result, the balls 13 are located at the deflecting position 16 outside of interference with the track of the spindle 1. After rolling through the deflecting recess 16, the balls engage the track of the spindle 1 again and control it.

The measures described up until now are not yet sufficient to allow the balls to follow the path of the track to the deflecting position 16. Namely, the balls 12 must still be prevented from rolling on straight ahead to the deflecting position 16 instead of the deflecting recess 23. For this purpose, it is provided that deflecting surfaces reaching to both ends of the deflecting recess 16 in the track of the spindle and lifting these balls from this track into the deflecting recess are available, and that the spherical track is covered between the two deflecting surfaces on the spindle 1 by means of a covering that reaches into the annular gap 2 between nut 3 and spindle 1. Therefore, the balls 13 are first diverted from one of the two deflecting surfaces from the spindle 1 to the deflecting recess 23, after which they roll off from the covering, and after that come back again over the other deflecting surface in the track of the spindle. In a manner of speaking, both of the deflecting surfaces obstruct the balls from the path running on straight ahead, whereby one therefore requires a deflecting surface on both sides of the deflecting recess, because of course the spindle or the nut can rotate in both rotational directions, such that the balls must also be able to run through the spherical tracks in both directions.

The deflection of the balls 13 at the deflection positions 16 take place with the help of inserts. This involves insertion bodies 35, 36, 37, which are represented in the FIGS. 3 and 4 with thickly drawn lines, whereby only the insertion bodies 35 are complete, but the insertion bodies 36, 37 are shown as cut. Two insertion bodies are associated with each deflection position 16. An insertion body is arranged between two spherical tracks adjacent to one another or spherical runs. These two insertion bodies, for example the insertion bodies 35, 36, which are arranged for the deflection position containing the deflection recess 23, are independent from one another and have a toric shape, in particular as appears graphically in FIG. 4. These toric bodies (which appear as essentially circular in the cross section) are curved corresponding to the tracks of the nut and of the spindle, which means they extend along an arc of a circle in the side view. One of the two insertion bodies, for example, the insertion body 35, lies in the thread 38 of the track 4 of the nut 3, as well as in the facing thread 39 of the track 5 of the spindle 1. The other insertion body 36 is inserted into the adjacent thread 40 of the track 4 of the nut 3, as well as into the track of the spindle facing this one, which is not visible in FIG. 4. Both of the insertion bodies 35, 36 associated with the respective deflecting positions are therefore arranged in adjacent threads of the tracks of the nut and of the spindle, whereby they come to an end at the respective deflecting positions 16 coming from opposite sides. At the same time, both of the insertion bodies 35, 36 face one another with their front sides at an angle, between which the respective deflecting recess 23 are located. In each case, these front sides, with their sections inserted into the track of the spindle 1, are preferred for the formation of deflecting surfaces lifting the balls 13 out of the track 5 of the spindle 1, and are cambered at an angle for the lateral control of the balls. In FIG. 3, in which the insertion bodies seen from the spindle are represented, the preferred sections 41, 42 are visible, which, according to FIG. 4, seat nearly aground for the track 5 of the spindle 1, whereby a clearance is present here. The front sides return out of these sections 41, 42 in the longitudinal direction of the respective insertion bodies as seen towards the nut, whereby the dividing lines 43, 44 of the front sides 45, 46 running towards the nut are indicated with dotted lines in the FIGS. 3 and 4. At the same time, these front sides are positioned at an angle and cambered in such a manner that one obtains a flowing deflection of the balls in the deflecting recess 23. In addition, each of the insertion bodies now contains a lateral projecting part 47 or 48 on the side of the interruption 19 relating to the deflecting recess 23 of the shoulder 6 of the nut 3, whereby this projecting part runs up to the front side of the insertion body facing the respective deflecting position 16. In addition, these projecting parts 47, 48 stand in extension for the shoulder 6 of the nut 3 over the interruption 19 of this shoulder, on which the deflecting recess 23 is located, whereby the projecting parts 47, 48 are arranged in the annular gap 2 between nut 3 and spindle 1. As seen in the top view of the spindle, the projecting parts 47, 48 (see FIG. 3) have a lightly rounded outer contour, which passes over into the dividing lines of the related front sides of the insertion bodies in a flowing manner. The two projecting parts 47, 48, in each case belonging to an adjacent insertion body, face themselves with slight distance and in each case form a half of the covering of the spherical track for the spindle. Therefore, the balls are led inside the deflecting position on one hand at the bottom of the deflecting recess 23 and on the other hand not only at the cambered front side of the two insertion bodies, but also at the two projecting parts 47, 48.

Each insertion body, for example the insertion body 35, extends itself inside the related threads 38 or 39 of the nut 3 or of the spindle 1 up to the deflecting position of the adjacent spherical track, as appears graphically in FIG. 3. At the same time, the insertion body on the other front side 50, which is associated with this adjacent deflecting position, is correspondingly formed like the already described front side and, in addition, a corresponding lateral projecting part 52 is present there. In other words, one rotates the insertion bodies 35, 36, 37 around its transverse medial axis 55 running in a radial direction around 180°, thus exactly the same shape results in turn. In this manner, the halves from two insertion bodies are assigned to each deflecting position, while the respective other half of each insertion body is assigned to one of the two adjacent deflecting positions. Thus the insertion body 35, for example, limits the deflecting position related to the deflecting recess 23 with its one front side 45 and the laterally facing projecting part 47, and the deflecting position or related spherical track adjacent to the left in FIG. 3 with its other front side 50 and the laterally facing projecting part 51.

It can be seen that the areas of the spherical tracks of the spindle that are not covered, and the nut that is located in each case between two deflecting positions, are filled by the insertion bodies, such that no empty space is present, into which one can otherwise inadvertently pour in balls during the assembly, which were split during operation.

For fastening the insertion bodies it is provided that a radially projecting fastening pin 52 is affixed to them on the outer circumference, which is inserted into a corresponding tapped blind hole 53 of the nut. Alternatively, the insertion bodies can also be attached with adhesive or weld.

Ideally, the insertion bodies 35, 36, 37 can be produced as single pieces out of plastic or metal.

Figure 4:
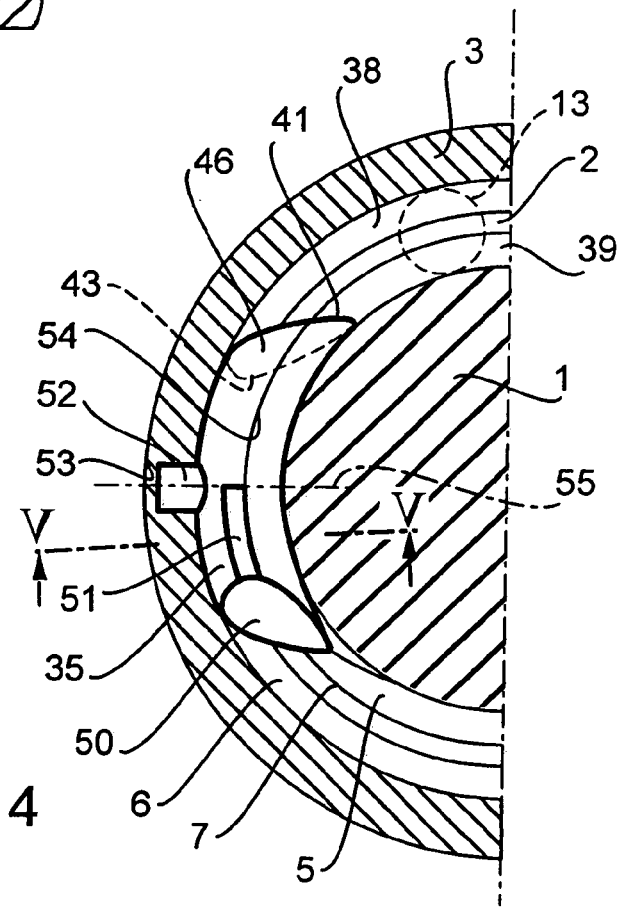
FIG. 4 is a sectional view according to lines IV—IV in FIG. 3 showing the arrangement according to FIG. 3 with inserted spindles.

It can be yet further seen from FIGS. 3 through 5 that a continuous stepped surface 54 is present in the longitudinal direction on the outer circumference of the insertion bodies 35, 36, 37, which passes over into the lower side of the respective lateral projecting part 47, 51 facing the spindle 1, in order to obtain an appropriate radial and axial clearance in the spherical track of the spindle.

Figure 6:
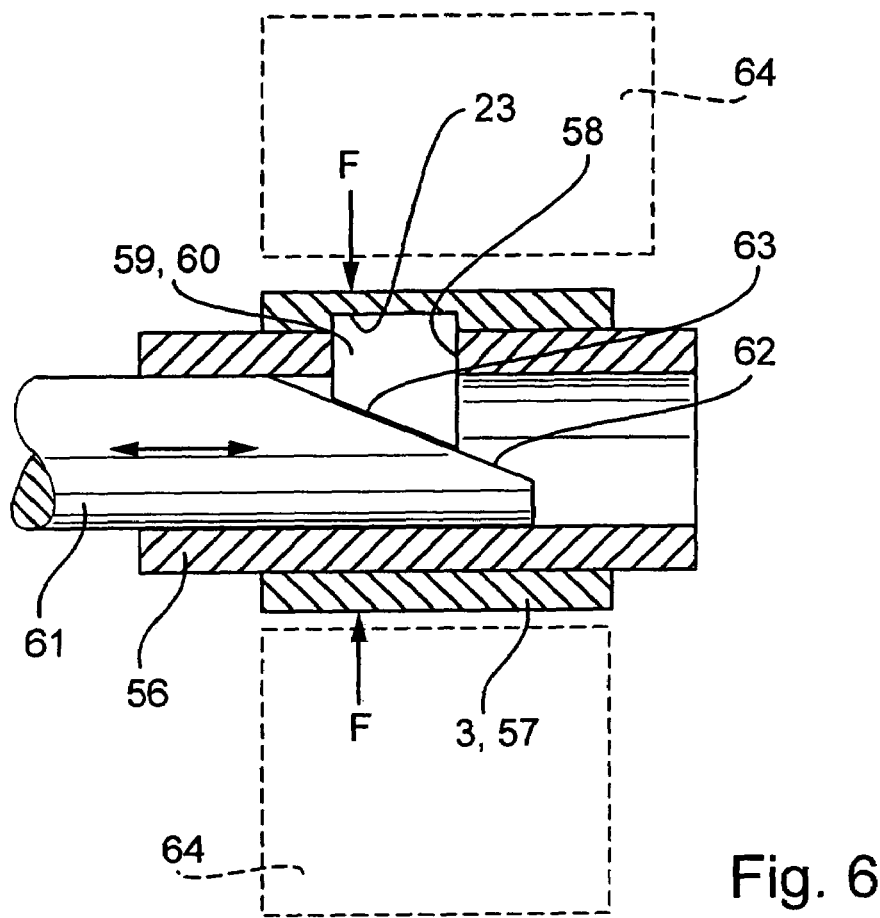
FIG. 6 shows a method according to the invention and a device according to the invention for the production of spindle nuts and FIG. 7 is a view of an additional device according to the invention.

FIG. 6 shows in a schematic representation the production of the spindle nut 3 according to the invention, as well as a device according to the invention for carrying out the method. A tool arbor 56 is first introduced into a hollow blank 57. The tool arbor 56 is provided with a counter profile (not represented here) on its outer shell surface for the track 4 of the spindle nut 3. In addition, the tool arbor 56 is provided with a recess 58, in which a radially arranged transverse stamp 59 is placed. As projecting part 60, the stamp 59 forms the counter profile at the deflecting recess 23 at the inner circumferential surface of the spindle nut 3. The tool arbor 56 is of a hollow design, whereby a connecting rod 61 is placed in the tool arbor 56 in an axial transverse manner. The connecting rod 61 is provided with a wedged surface 62, which works together with a counter surface 63 of the stamp 59. FIG. 6 shows the stamp 59 in its extended position. External forces F now operate on the blank 57, under which the material of the blank 57 is formed onto the contour of the tool arbor 56 with its stamp 59. The force F is exerted over kneading jaws 64, which are represented with dotted lines in the FIG. 4. The kneading jaws 64 carry out a compact stroke during a rotation relative to the blank 57. This process is ended when the tracks 4 on the inner circumference of the blank 57 and the deflecting recess 23 are shaped. The connecting rod 61 is now axially shifted to the extent that the stamp 59 comes free. Now the stamp 59 can be shifted radially inwards. In this connection, the tool arbor 56 can then be un-screwed from the spindle nut 3.

Figure 7:
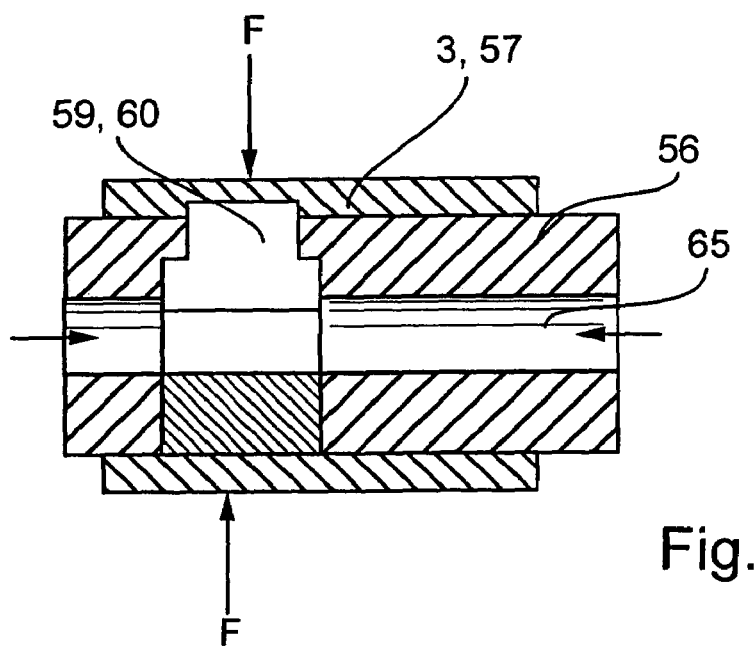

FIG. 7 shows the same method as does FIG. 6, but with a modified device for carrying out the method in comparison with FIG. 6. Here, instead of a connecting rod, hydraulic fluid 65 is poured into the hollow tool arbor 56. The hydraulic fluid 65 can be pressurized. The stamp 59 is held in its position driven radially outward under the adjacent pressure. After the pressure is taken away, the stamp 59 can be shifted radially inward.

The invention claimed is:

1. Method for the production of a spindle nut (3) of a spherical thread drive mechanism, whereby the spindle nut (3) has at least one screw-shaped track (4) formed as a single piece on its inner circumference, having threads (38) that are limited by shoulders (6), whereby the shoulder (6) is interrupted by at least one deflecting recess (23) at at least one deflecting position, in order to deflect balls (13) out of one thread into an adjacent thread (38), the method comprising:

arranging a tool arbor (56) in a hollow blank (57), the tool arbor (56) having on an outer circumference a counter profile of the screw-shaped track (4) and a projecting part (59) for each of the at least one deflecting recesses, providing a tool that operates on and reshapes the blank (57) from the exterior by exercising radial forces (F), and reshaping an inner circumferential surface of the hollow blank (57) to the counter profile and to the projecting part (59) of the tool arbor (56), forming the screw-shaped track (4) and the deflecting recess (23).

2. Method according to claim 1, wherein the reshaping takes place by kneading comprising radially impacting kneading jaws (64) against the blank (57) to reshape the blank, and rotating the kneading jaws (64) and the blank (57) relative to one another.

3. Method according to claim 1, further comprising removing the tool arbor (56) after the reshaping process, and then hardening the spindle nut (3) with a heat treatment.

4. Device for carrying out the method according to claim 1, whereby the tool arbor (56) has a recess (58), in which the projecting part (59) is formed as a stamp (60), which can be affixed in extended positions radially transverse outwards and inwards in comparison with the tool arbor (56), and the stamp (60) is arranged in the extended position within the counter profile of the tool arbor (56).

5. Device according to claim 4, wherein the tool arbor (56) is formed in a hollow manner, a connecting rod (61) is arranged in the hollow tool arbor (56) and works with the stamp (60), the connecting rod being held in an extended position in a primary connection position of the connecting rod (61) and the stamp (60).

6. Device according to claim 4, wherein the tool arbor (56) is formed in a hollow manner, and hydraulic fluid (64) located in the tool arbor (56) can be pressurized and works together with the stamp (60), which is held in an extended position by pressure of the hydraulic fluid.

* * * * *